Patented Feb. 6, 1940

2,189,438

UNITED STATES PATENT OFFICE 2,189,438

FODDER AND METHOD OF MAKING SAME

Lynwood H. Smith, Kansas City, Mo., and Charles F. Schnabel, Kansas City, Kans., assignors to American Dairies Incorporated, Kansas City, Mo., a corporation of Maryland No Drawing. Application August 9, 1937, Serial No. 158,152

1 Claim. (Cl. 99—8)

Our invention relates to fodder and to a method of making the same, and more particularly to a fodder of greens such as grasses, legumes, vegetables and the like, possessing high food value and biological worth.

This application is a continuation-in-part of our co-pending application, Serial No. 48,056, filed November 2, 1935.

It is well known that ordinary methods of field curing greens, as in the curing of hay, are very destructive to carotene, chlorophyll and xanthophyll, and other valuable principals contained in the fresh products which are subject to oxidation and deterioration by sunlight. It is also known that artificially dried hay when first made is higher in carotene, chlorophyll and xanthophyll, many of the proteins, lipins and valuable ingredients.

Both the artificially dehydrated and field cured hay deteriorate in biological and food value in storage. It is known, for example, that the carotene content in artificially dried hay can be maintained if the hay is kept in cold storage at or below the freezing point of water.

The cold storage of bulky products, such as dehydrated greens, is an expensive proceeding, and the cost is so prohibitive that farmers cannot employ it. At 70° F. the loss of carotene content in hay will average about 10% a month.

In the instant specification we will use hay for purposes of illustration, though it is to be understood that our invention is applicable to all types of dried greens suitable for use as a fodder or feed.

When hay is stored at temperatures prevailing in most hay barns, especially those with metal roofs, the hay will lose its carotene content at the rate of about 50% a month. It will be obvious that good hay will become practically worthless as a source of vitamin A in a very short time.

One method of maintaining the vitamin content in fodder is described in our co-pending application.

One object of our invention is to provide another method of providing a source of fodder or feed which will remain rich in vitamins though stored over an extended period of time.

Other and further objects of our invention will appear in the following description.

A method of dehydration which appears to leave vitamins and biologically beneficial elements present in the feed in high quantities, is the so-called "flotation" process. This method contemplates contacting the greens momentarily to a hot gas. The temperature at which this contact may be made may range from 900° F. to 1800° F. It appears that the leaf is not injured by the contact with high temperatures due to the fact that the evaporation of water present serves to keep the interior of the leaf at a temperature below which damage is done to the vitamins. The temperature, however, is sufficiently high to kill the bacteria on the surface of the leaves and to destroy enzymatic action. The momentary high temperature besides destroying bacteria and enzymatic action, paralyzes the stomata of the leaves which are normally in open position in a turgid leaf.

As pointed out hereinabove, even though a hay high in vitamins and other beneficial biological nutritive factors may be obtained by artificial dehydration, this hay will deteriorate in its vitamin content in storage.

It is also important that the drying take place within a short time after harvesting. This time should be so short that the stomata of the leaves are still open. We have found in practice that the drying should take place within an hour after cutting in the field.

In practicing our method, we harvested the greens and within thirty minutes to an hour after harvesting, subjected them to drying. If desired they may be comminuted before drying. They are dried in such a manner that a high vitamin content is retained.

The finely divided dried hay is then intimately mixed with a condensed creamery milk or buttermilk containing from 10% to 25% solids. If the solids are higher than 25%, the higher viscosity prevents each particle of dried greens from being completely covered with condensed milk. If the solid content is below 10%, the protein film resulting after the mixture is desiccated will be too thin to give protection. We prefer to use a condensed creamery buttermilk having approximately 20% solids, as we find that this percentage of solids will not only cover each particle, but will tend to agglomerate several small particles to form small masses or spheres which tend to retain their identity when dried.

By "buttermilk" we mean any milk product such as churned buttermilk, whole milk, skim milk, whey or cream which has been soured by fermentation and then partially dehydrated to bring it within the desired solid content, it being understood, of course, that the products may be used without being fermented if partially dehydrated to give the desired solids content.

After the desiccated greens and the condensed buttermilk are thoroughly mixed, the wet mixture is dehydrated. If desired, the dehydrator used for dehydrating the greens may be employed but operated at a much lower temperature. The resulting product will be particles of dried greens completely encased by milk proteins.

This product is then packed in barrels or sacks or other suitable containers, with as little attrition as possible, the object being to maintain the protein coating over each particle of dried greens.

We have found that thus coating each particle of hay with a protecting film of milk protein enables the material to retain a high vitamin content at ordinary storage temperatures. Our product loses its nutritive value at one tenth the rate of unprotected hay stored under the same conditions.

It will be understood, of course, that if desired, a small percentage of an edible oil, such as corn oil, cottonseed, cocoanut or olive oil may be homogenized with the condensed milk or buttermilk. The oil tends to make the coating less brittle. If desired, we may add sugar, or other edible products to make it more palatable for human consumption, to the condensed milk or buttermilk, and have found that this likewise renders the coating more resistant to attrition.

It will be observed that we have accomplished the objects of our invention. We have provided a novel fodder or feed with a novel method for preserving desiccated greens in such a manner as to enable them to retain a high biological value, furnishing stock or humans with vitamins during winter months, keeping them in better health and aiding in growth and reproduction.

To further encourage agglomeration of many fine particles into larger masses—the proportion of fodder and milk is regulated so that the wet mixture may be pressed through perforated metal plates or sheets just before drying. Shaking the agglomerations in thin layers over a smooth surface tends to smooth and polish the surface, which further increases the preservative effect.

Besides preserving the fodder, the milk protein coating has other obvious advantages. It increases the specific gravity of the fodder so that when mixed with water, it wets and sinks immediately and the plant pigments do not dissolve and color the solvent green as is the case with untreated fodder. This is a distinct advantage in rendering the fodder more palatable to the taste.

It will be understood that certain features and sub-combinations are of utility and may be employed without reference to other features and sub-combinations. This is contemplated by and is within the scope of our claim. It is further obvious that various changes may be made in details within the scope of our claim without departing from the spirit of our invention. It is, therefore, to be understood that our invention is not to be limited to the specific details shown and described.

Having thus described our invention, what we claim is:

A method of preparing a fodder including the steps of harvesting greens, comminuting the same, desiccating the comminuted greens, intimately mixing the desiccated greens with a milk product having a solids content from 10% to 25%, and dehydrating the resultant mixture.

LYNWOOD H. SMITH.
CHARLES F. SCHNABEL.